United States Patent [19]

Watanabe

[11] 4,129,366
[45] Dec. 12, 1978

[54] PHOTOMETRIC DEVICE FOR A CAMERA

[75] Inventor: Sakuji Watanabe, Yono, Japan

[73] Assignee: Nippon Kogaku K.K., Tokyo, Japan

[21] Appl. No.: 672,770

[22] Filed: Apr. 1, 1976

[30] Foreign Application Priority Data

Apr. 30, 1975 [JP] Japan .............. 50-57767[U]

[51] Int. Cl.² ............................. G03B 7/08
[52] U.S. Cl. ......................... 354/24; 354/51; 354/60 L
[58] Field of Search ............... 354/24, 51, 60 L, 60 E, 354/60 R

[56] References Cited

U.S. PATENT DOCUMENTS

| | | | |
|---|---|---|---|
| 3,850,530 | 11/1974 | Uno et al. | 354/31 X |
| 3,964,076 | 6/1976 | Ichihashi | 354/51 |
| 3,975,746 | 8/1976 | Beppu | 354/24 X |
| 3,977,011 | 8/1976 | Matsuda | 354/24 |

Primary Examiner—Michael L. Gellner
Attorney, Agent, or Firm—Fitzpatrick, Cella, Harper & Scinto

[57] ABSTRACT

A photometric device for a camera, wherein there are provided a photometric circuit having a photo-electric conversion element of quick photo-responsive characteristic so as to convert light from an object to be photographed into a photo-electric output signal, and a capacitor and resistor for attenuating amplitude of an alternating current component having a frequency as high as an integral multiple of the frequency of a commercial power source in an output signal from the photometric circuit.

2 Claims, 2 Drawing Figures

PHOTOMETRIC DEVICE FOR A CAMERA

BACKGROUND OF THE INVENTION

1. Field of the Invention

This invention relates to a photometric device for use in photographic cameras, and more particularly, to such a device which provides a proper exposure indication under certain variable light conditions.

2. Description of the Prior Art

In recent years, it has been known to use a photo-diode, a photo-transistor, and so forth, having a quick photo-responsive characteristic for a photometric circuit in cameras and the like. When the abovementioned photo-electric conversion element receives light having a light intensity which varies with a frequency twice as high as the frequency of a commercial power source, such as, for example, light from a fluorescent lamp (i.e. 100Hz, 120Hz), the response speed of the element surpasses the abovementioned periodic variation in light intensity with the consequence that an output from the photometric circuit inevitably possesses frequency characteristics of a periodically varying nature. Accordingly, such a difficulty with the known photo-electric conversion element made it inevitable that no accurate indication of proper exposure values could be realized when proper exposure, shutter speed or aperture value to achieve a proper exposure with respect to a light intensity was to be indicated on the basis of an output from the photometric circuit, because these values were also subject to periodic variations.

SUMMARY OF THE INVENTION

I have conceived and contribute by the present invention a photometric device by which I am able to overcome the foregoing problem and to ensure a proper exposure indication, even when a light having periodically varying intensity is to be measured.

According to the present invention, generally speaking, there is provided a photometric device for a camera, which device comprises a photometric circuit having photo-electric conversion element of quick photo-responsive characteristic such as a photo-diode and a photo-transistor so as to convert light from an object to be photographed into a photo-electric output signal, and a capacitor for attenuating the amplitude of an alternating current, a component having a frequency as high as an integral multiple of the frequency of a commercial power source in an output signal from the photometric circuit.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BREIF DESCRIPTION OF THE DRAWINGS

Specific embodiments of the invention have been chosen for purposes of illustration and description, and are shown in the accompanying drawings, forming a part of the specification, wherein.

DETAILED DESCRIPTION OF PREFERRED EMBODIMENTS

Figure 1:
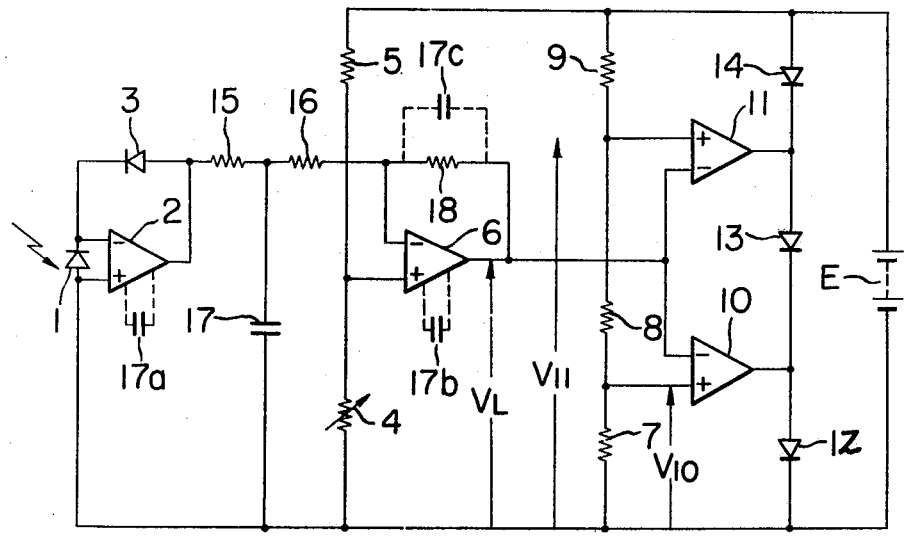
FIG. 1 is a circuit diagram of one embodiment of the present invention.

Referring now to FIG. 1 which shows one embodiment of the device according to the present invention, a photo-diode 1, which receives light from an object to be photographed, is connected between positive and negative input terminals of an operational amplifier 2. Since a diode 3 for logarithmic conversion is connected between an output terminal and the negative input terminal of the operational amplifier 2, an output from the operational amplifier 2 takes a value proportional to a logarithm of the light intensity. A variable resistor 4 may have its resistance value varied by the setting of various exposure factors such as aperture value, shutter speed, sensitivity of a film loaded in a camera, and so on, and an exposure factor introducing circuit is constructed with the variable resistor 4 and a resistor 5 connected in series across the terminals of a power source E, an output being produced at a connection of the two resistors, as an output terminal, in accordance with the abovementioned established exposure factors. Another operational amplifier 6 functions to compare and amplify an output from the operational amplifier 2 in association with the abovementioned light intensity, the output of amplifier 2 being connected to the negative input of amplifier 6 through resistors 15 and 16 and an output from the exposure factor introducing circuit 4, 5 being connected to the positive input of the amplifier 6. In the above-described manner, the photo-diode 1, operational amplifiers 2 and 6, and a resistor 18, constitute a photometric circuit.

Resistors 7, 8 and 9 which are mutually connected in series, operational amplifiers 10 and 11, and light emitting diodes 12, 13 and 14 constitute an exposure indicator circuit. An output potential from the operational amplifier 6 in association with the light intensity and other exposure factors is applied to the negative input terminals of the operational amplifiers 10 and 11. Now, when the output potential is expressed by "$V_L$", and when input potentials of the positive input terminals of the operational amplifiers 10 and 11 are expressed by "$V_{10}$" and "$V_{11}$", respectively, only the light emitting diode 12 emits light if $V_L$ is smaller than $V_{10}$ ($V_L < V_{10}$), while only the light emitting diode 13 emits light if $V_{10}$ is smaller than $V_L$ and $V_L$ is smaller than $V_{11}$ ($V_{10} < V_L < V_{11}$), and only the light emitting diode 14 emits light if $V_{11}$ is smaller than $V_L$ ($V_{11} < V_L$). Accordingly, by appropriately determining values of $V_{10}$ and $V_{11}$, it becomes possible to cause the light emitting diodes 12, 13 and 14 to emit light in correspondence to respective situations, wherein the combination of the light intensity and other exposure factors provides over-exposure, proper exposure, and under-exposure indications. Incidentally, when the intensity of the incident light into the photo-diode 1 varies with a frequency of, for example 100Hz, the output from the photo-diode 1 periodically varies, with consequent periodic variations in the output from the operational amplifier 6 because the response in the photo-electric conversion of the photo-diode is extremely rapid (a few hundred KHz and above). When the amplitude of the alternating current component in the output voltage from this operational amplifier 6 is so large that it is not negligible in comparison with ($V_{11} - V_{10}$), for example, when it is greater than ($V_{11} - V_{10}$), the light emitting diodes 12 and 13, or light emitting diodes 13 and 14, or all the light emitting diodes 12, 13 and 14, are alternately turned on and off at a frequency of 100Hz, so that each light emitting diode emits light in a time span of 1/100 second. However, as the light response speed of the human eye is not as high as this alternate on-off condition of the light emitting diodes, it appears to the eye that these light emitting diodes emit light simultaneously with the result that no proper exposure indication can be obtained. In order therefore to avoid such erroneous indication, the present embodiment constructs the circuit in such a manner that resistors 15 and 16, and a capacitor 17, are provided between the output side of the operational amplifier 2 and the output side of the operational amplifier 6. In this circuit construction, by appropriately selecting the values of the resistors 15, 16 and the capacitor 17 so as to satisfy the following equation, it becomes possible to attenuate amplitude of the alternating current component in the output from the operational amplifier 2 having the abovementioned frequency whereby the thus attenuated amplitude becomes negligible in comparison with ($V_{11} - V_{10}$).

$$T << C \frac{R_{15} \cdot R_{16}}{R_{15} + R_{16}}$$

(where: $R_{15}$ and $R_{16}$ are the resistance values of the resistors 15 and 16, respectively; C is an electrostatic capacitance of the capacitor 17; and T is a cycle of the alternating current component in the output from the operational amplifier 2 having a frequency as high as an integral multiple of the frequency in the commercial power source.)

As a result, even when an incident light having periodically varying light intensity is used, the light emitting diodes 12, 13 and 14, as the exposure indicating elements, never perform such abnormal functions that they emit light simultaneously.

For convenience in manufacture, it is easiest to dispose the capacitor 17 at the illustrated position, although this position is not limitative, but any other positions can be contemplated. For example, as is the case with capacitors 17a and 17b, they may be connected to the operational amplifier 2 or 6 so as to retard the frequency response of the respective operational amplifier 2 or 6, or as is the case with the capacitor 17c, it can be connected in parallel with a resistor 18.

Figure 2:
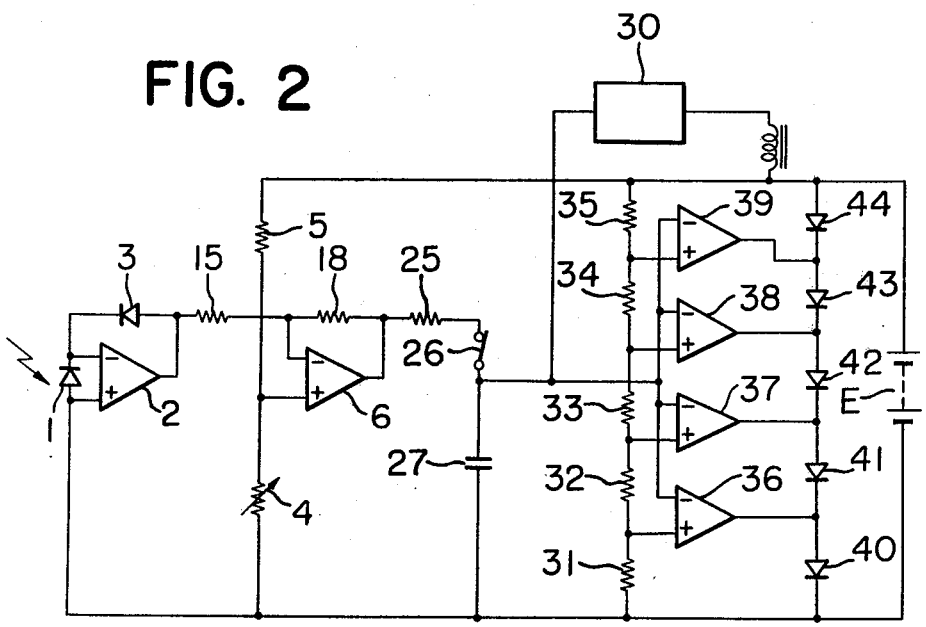
FIG. 2 is a circuit diagram of another embodiment according to the present invention.

Referring now to FIG. 2, another embodiment of the present invention will be described. This second embodiment of the present invention is applied to the photometric circuit of TTL system in an automatic exposure time controlling camera, in which a capacitor for memorizing light intensity is also used as a capacitor for attenuating the alternating current component in the output from the photo-diode.

In more detail, an output current from the operational amplifier 6 having a value associated with the light intensity, aperture value, and film sensitivity, charges a capacitor 27 for memory through the resistor 25 and the memory switch 26. The switch 26 is interlocked with the shutter release operation so as to be opened prior to interception of the incident light into the photo-electric conversion element, and causes an output from the operational amplifier 6 to be memorized in the capacitor 27. An exposure time control circuit 30 of a well known type determines the exposure time on the basis of the memorized value in the capacitor 27. The photometric indicator circuit is constructed with resistors 31 - 35 in series across the power source E, operational amplifiers 36 - 39, and light emitting diodes 40 - 44 in series across the power source E, wherein any one of the light emitting diodes 40 - 44 is turned on in accordance with an output value of the operational amplifier 6 to indicate the exposure time to be controlled by the control circuit 30. The time control circuit 30 is connected between one side of the power source E and a line interconnecting the capacitor side of the switch 26 and the serially connected input sides of the amplifiers 36 - 39, the positive input sides of which are connected respectively between adjacent resistors 31 - 35 and the output sides of which are connected between respective adjacent sides of the diodes 40 - 44.

In this embodiment, by appropriately selecting the resistor 25 and the capacitor 27 to satisfy the following equation, it becomes possible to attenuate amplitude of the alternating current component in the output from the operational amplifier 6 having the abovementioned frequency.

$$T << C \cdot R_{25}$$

(where: $R_{25}$ is a resistance value of the resistor 25; C is a capacitance of the capacitor 27 for memory; and T is a cycle of the alternating current component in the output from the operational amplifier 2.)

As is now apparent from the foregoing explanations of the present invention, a photometric device of a simple construction and capable of performing an accurate photometric indication, can always be obtained according to the present invention by the use of a photo-electric conversion element having a quick photo-responsive characteristic, the element of which can well respond to abrupt variation in the light amount from an object to be photographed, but does not respond to any periodic variation in the light intensity, even if it is subject to periodic variation in the frequency of, for example, 100Hz or its vicinity.

I believe that the construction and operation of my novel photometric device will now be understood and that the advantages thereof will be fully appreciated by those persons skilled in the art.

I claim:

1. In a photometric device for cameras which comprises:
    a photometric circuit including an operational amplifier, a photo-diode connected between two input terminals of the operational amplifier to convert light from an object to be photographed into a photo-electric signal and a logarithmic conversion element connected between one of the input terminals of the operational amplifier and an output terminal thereof to produce an output proportional to a logarithmic of an output current from said photo-diode;
    a plurality of elements for indicating exposure conditions measured by the photometric circuit; and a control circuit for controlling said indicating elements in accordance with the output from the photometric circuit;

the improvement comprising a capacitor;

resistance means connected to the capacitor, the resistance means and the capacitor cooperating to attenuate the amplitude of the alternating current component included in the output from the photometric circuit and having a frequency an integral number of times as high as the frequency of a commercial power source, a time constant determined by the capacitor and the resistance means being greater than the period of the alternating current component of the output from said photometric circuit, whereby said indicating elements can display without being influenced by said alternating current component.

2. In a photometric device for cameras which comprises:

a photometric circuit including an operational amplifier, a photo-diode connected between two input terminals of the operational amplifier to receive light coming from an object to be photographed and passed through an objective of the camera, and a logarithmic conversion element connected between one of the input terminals of the operational amplifier and an output terminal thereof to produce an output proportional to the logarithm of the output current from the photo-diode;

a plurality of indicating elements for indicating exposure conditions measured by the photometric circuit;

a control circuit for controlling the indicating elements in accordance with the output from the photometric circuit;

means for interrupting said light passed through the objective from impinging on the photo-diode in response to the shutter release operation;

a memory capacitor for memorizing the output of the photometric circuit produced prior to said interruption;

the improvement comprising resistance means connected to said capacitor, the resistance means and the capacitor cooperating to attenuate the amplitude of the alternating current component included in the output from the photometric circuit and having a frequency an integral number of times as high as the frequency of a commercial power source, and a time constant determined by the capacitor and the resistance means being greater than the period of the alternating current component in the output from said photometric circuit, whereby said indicating elements can display without being influenced by said alternating current component.

* * * * *